United States Patent
Boeshans et al.

(10) Patent No.: US 9,688,134 B2
(45) Date of Patent: Jun. 27, 2017

(54) EXHAUST SYSTEM FOR AN OFF-ROAD VEHICLE

(71) Applicant: CNH Industrial America LLC, New Holland, PA (US)

(72) Inventors: James Patrick Boeshans, Hawley, MN (US); Jason Keith Novacek, West Fargo, ND (US); John Thomas Rasset, Barnesville, MN (US); Jay Michael Larson, Fargo, ND (US); David Larry Tveito, West Fargo, ND (US); Russell Victor Stoltman, Frankfort, IL (US); Chad Bautz, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/826,073

(22) Filed: Aug. 13, 2015

(65) Prior Publication Data
US 2016/0046182 A1 Feb. 18, 2016

Related U.S. Application Data

(60) Provisional application No. 62/037,546, filed on Aug. 14, 2014.

(51) Int. Cl.
*B60K 13/04* (2006.01)
*F01N 3/10* (2006.01)
*F01N 3/20* (2006.01)
*F01N 13/18* (2010.01)

(52) U.S. Cl.
CPC ............ *B60K 13/04* (2013.01); *F01N 3/103* (2013.01); *F01N 3/208* (2013.01); *F01N 13/1805* (2013.01); *B60Y 2200/221* (2013.01)

(58) Field of Classification Search
CPC ............ F01N 2590/08; F01N 13/1822; F01N 13/1805; B60K 13/04; B60K 13/06; B60K 11/04; B60K 11/00; B62D 25/10; B62D 25/12
See application file for complete search history.

(56) References Cited

U.S. PATENT DOCUMENTS

| | | | | |
|---|---|---|---|---|
| 3,933,216 A | * | 1/1976 | Irwin | B60K 13/02 180/235 |
| 4,632,210 A | * | 12/1986 | Yamamoto | F01N 13/08 180/219 |
| D297,239 S | * | 8/1988 | Funabashi | D15/23 |

(Continued)

FOREIGN PATENT DOCUMENTS

EP 2752327 7/2014

OTHER PUBLICATIONS

European Search Report for EP Application No. 15180786.4 issued Dec. 14, 2015 (6 pages).

*Primary Examiner* — J. Allen Shriver, II
*Assistant Examiner* — Travis Coolman
(74) *Attorney, Agent, or Firm* — Rickard K. DeMille; Rebecca L. Henkel

(57) ABSTRACT

A system includes a muffler coupled to a frame of the off-road vehicle and mounted in a substantially horizontal orientation and a diesel oxidation catalyst (DOC) fluidly and mechanically coupled to the muffler. In certain embodiments, the DOC is mounted in a substantially vertical orientation rearward of the muffler relative to a primary direction of travel of the off-road vehicle.

19 Claims, 5 Drawing Sheets

(56) References Cited

U.S. PATENT DOCUMENTS

| | | | | |
|---|---|---|---|---|
| 4,766,983 A | * | 8/1988 | Tamba | F01N 13/08 181/204 |
| 5,689,953 A | * | 11/1997 | Yamashita | B60K 11/02 123/41.49 |
| 6,499,561 B1 | | 12/2002 | Yasuda | |
| 6,983,728 B1 | * | 1/2006 | Banks, Jr. | F01N 13/16 123/198 R |
| 7,735,437 B2 | * | 6/2010 | Pollington | A01C 23/023 111/174 |
| 8,191,668 B2 | * | 6/2012 | Keane | B60K 13/04 180/296 |
| 8,418,448 B2 | * | 4/2013 | Kamata | B60K 5/1208 60/299 |
| 8,572,954 B2 | * | 11/2013 | DeYoung | F01N 13/18 60/311 |
| 8,651,218 B2 | * | 2/2014 | Okada | E02F 9/0866 180/296 |
| 8,820,691 B2 | * | 9/2014 | Bednarz | F01N 13/1822 123/65 A |
| 8,827,021 B1 | * | 9/2014 | Nakagami | E02F 9/0891 180/309 |
| 9,222,383 B2 | * | 12/2015 | Togo | F01N 13/1811 |
| 9,238,901 B2 | * | 1/2016 | Kamimae | B60K 13/04 |
| 9,248,734 B2 | * | 2/2016 | Kiyokawa | B60K 13/04 |
| 9,314,750 B2 | * | 4/2016 | Stanavich | B01F 5/0451 |
| 9,316,136 B2 | * | 4/2016 | Kobayashi | B60K 13/04 |
| 9,322,310 B2 | * | 4/2016 | Mitsuda | E02F 9/00 |
| 9,334,786 B2 | * | 5/2016 | Himoto | E02F 9/0866 |
| 9,347,347 B2 | * | 5/2016 | Shin | F01N 3/00 |
| 9,353,502 B2 | * | 5/2016 | Hayashi | E02F 9/0866 |
| 9,353,668 B2 | * | 5/2016 | Noguchi | F01N 3/025 |
| 9,371,764 B2 | * | 6/2016 | Moran | F01N 3/2803 |
| 2008/0168764 A1 | * | 7/2008 | Recker | F01N 3/035 60/297 |
| 2010/0031644 A1 | * | 2/2010 | Keane | B60K 13/04 60/295 |
| 2010/0275588 A1 | * | 11/2010 | Kamata | B60K 5/1208 60/322 |
| 2011/0192671 A1 | * | 8/2011 | Mitsuda | B60K 13/04 180/309 |
| 2011/0283687 A1 | * | 11/2011 | Dobler | F01N 13/1805 60/299 |
| 2013/0233432 A1 | * | 9/2013 | Tanaka | F16L 9/19 138/114 |
| 2014/0124283 A1 | | 5/2014 | Novacek et al. | |
| 2014/0251713 A1 | * | 9/2014 | Aoyama | B60K 13/04 180/309 |
| 2014/0262590 A1 | * | 9/2014 | Daborn | F01N 3/035 180/309 |
| 2014/0348716 A1 | * | 11/2014 | Park | F01N 3/2066 422/171 |
| 2015/0001170 A1 | * | 1/2015 | Terata | B01D 53/94 212/302 |
| 2015/0114747 A1 | * | 4/2015 | Kiyokawa | B60K 13/04 180/309 |
| 2015/0135686 A1 | * | 5/2015 | Hasegawa | F01N 3/0231 60/297 |
| 2015/0275476 A1 | * | 10/2015 | Sakai | E02F 3/7631 172/701.1 |
| 2015/0377113 A1 | * | 12/2015 | Fujita | F01N 1/083 180/309 |
| 2016/0010525 A1 | * | 1/2016 | Sandou | A01D 41/12 60/301 |
| 2016/0017778 A1 | * | 1/2016 | Sandou | A01D 41/12 60/297 |
| 2016/0024752 A1 | * | 1/2016 | Mitsuda | E02F 9/0866 180/296 |
| 2016/0031486 A1 | * | 2/2016 | Shoen | B62D 25/12 180/68.3 |
| 2016/0032562 A1 | * | 2/2016 | Aoyama | B60R 3/00 180/68.3 |
| 2016/0053645 A1 | * | 2/2016 | Sandou | F01N 3/2066 60/301 |
| 2016/0096426 A1 | * | 4/2016 | Kurokawa | B60K 13/04 180/309 |
| 2016/0115671 A1 | * | 4/2016 | Sakai | E02F 3/7631 172/292 |
| 2016/0115840 A1 | * | 4/2016 | Azuma | F01N 3/208 180/309 |
| 2016/0115848 A1 | * | 4/2016 | Kurikka | B01F 5/0065 422/180 |
| 2016/0160726 A1 | * | 6/2016 | Imano | B60K 11/06 60/276 |

* cited by examiner

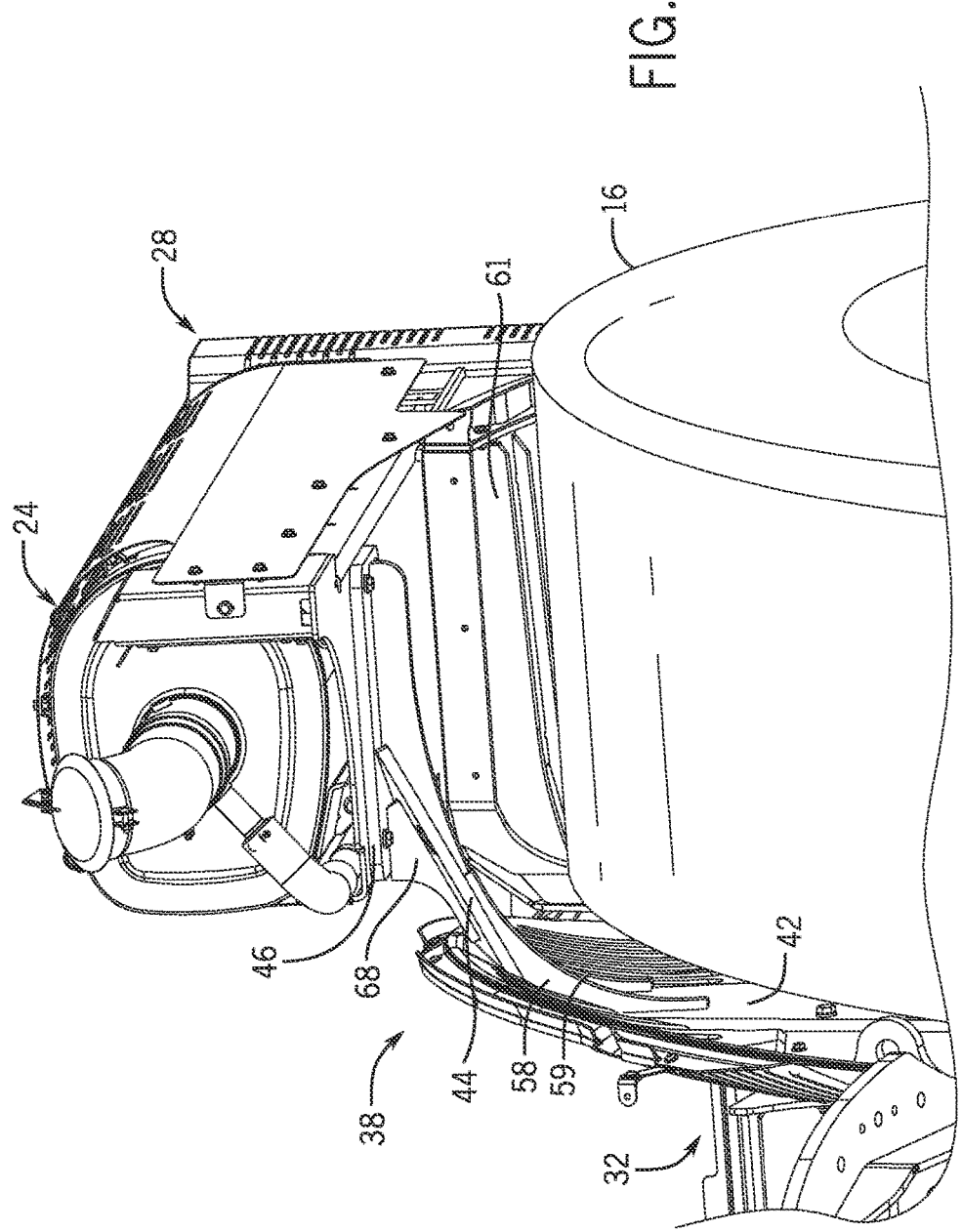

EXHAUST SYSTEM FOR AN OFF-ROAD VEHICLE

CROSS-REFERENCE TO RELATED APPLICATION

This application claims priority from and the benefit of U.S. Provisional Application Ser. No. 62/037,546, entitled "EXHAUST SYSTEM FOR AN OFF-ROAD VEHICLE," filed Aug. 14, 2014, which is hereby incorporated by reference in its entirety.

BACKGROUND

The invention relates generally to an exhaust system for an off-road vehicle.

Exhaust systems are used to guide exhaust gases away from a controlled combustion device, such as an engine. Exhaust systems may include components such as a cylinder head, an exhaust manifold, a turbocharger, a treatment system, and a muffler (e.g., silencer). In an exhaust system for an internal combustion engine, exhaust gases of each cylinder of the engine exit through the cylinder head. Thereafter, the exhaust manifold collects the exhaust gases from the cylinders into one or more conduits or pipes. In some exhaust systems, the flow of the exhaust gases may be directed from the conduits through the turbocharger. Accordingly, the exhaust gases may be used to drive a turbine of the turbocharger to induce rotation of an impeller, which compresses air used by the internal combustion engine. The exhaust gases may be treated in the treatment system to reduce certain compounds (e.g., NOx, particulates, etc.) in the exhaust gases. Then, the exhaust gases flow through a muffler that directs the exhaust gases out of the exhaust system and reduces noise of the exhaust. Certain off-road vehicles, such as tractors, may include a muffler that extends vertically within a line of sight of a driver of the vehicle. As such, the muffler may at least partially obstruct the vision of the driver.

BRIEF DESCRIPTION

In one embodiment an exhaust system for an off-road vehicle includes a muffler coupled to a frame of the off-road vehicle and mounted in a substantially horizontal orientation and a diesel oxidation catalyst (DOC) fluidly and mechanically coupled to the muffler. In certain embodiments, the DOC is mounted in a substantially vertical orientation rearward of the muffler relative to a primary direction of travel of the off-road vehicle.

In another embodiment a mounting assembly for an exhaust system of an off-road vehicle includes a front mount coupled to a frame of the off-road vehicle. The front mount includes a base coupled to the frame and extending in a substantially vertical direction. The front mount also includes a platform coupled to the base and extending laterally outward from the frame. In certain embodiments, the platform is configured to receive and to support a muffler. The exhaust system further includes a rear mount integrally formed within a fender of the off-road vehicle. The rear mount includes a panel disposed above a top surface of a shell of the fender. In certain embodiments, the panel is configured to receive and to support the muffler. The rear mount also includes a structural support configured to support the panel above the top surface of the shell of the fender. In certain embodiments, the front and rear mounts are configured to support the muffler in a substantially horizontal orientation relative to a ground plane.

In another embodiment an exhaust system for an off-road vehicle includes a front mount configured to couple to a frame of the off-road vehicle. The front mount is configured to extend over a wheel of the off-road vehicle and to receive a first portion of a substantially horizontal muffler positioned forward of a cabin of the off-road vehicle relative to a primary direction of travel. The exhaust system also includes a rear mount integrally formed within a fender. The rear mount is configured to receive a second portion of the substantially horizontal muffler. The exhaust system further includes a diesel oxidation catalyst (DOC) mounting assembly configured to secure a substantially vertically oriented DOC to a rear portion of the substantially horizontal muffler.

DRAWINGS

These and other features, aspects, and advantages of the present invention will become better understood when the following detailed description is read with reference to the accompanying drawings in which like characters represent like parts throughout the drawings, wherein:

FIG. 6 is a front perspective view of the exhaust system of FIG. 2.

DETAILED DESCRIPTION

Figure 1:
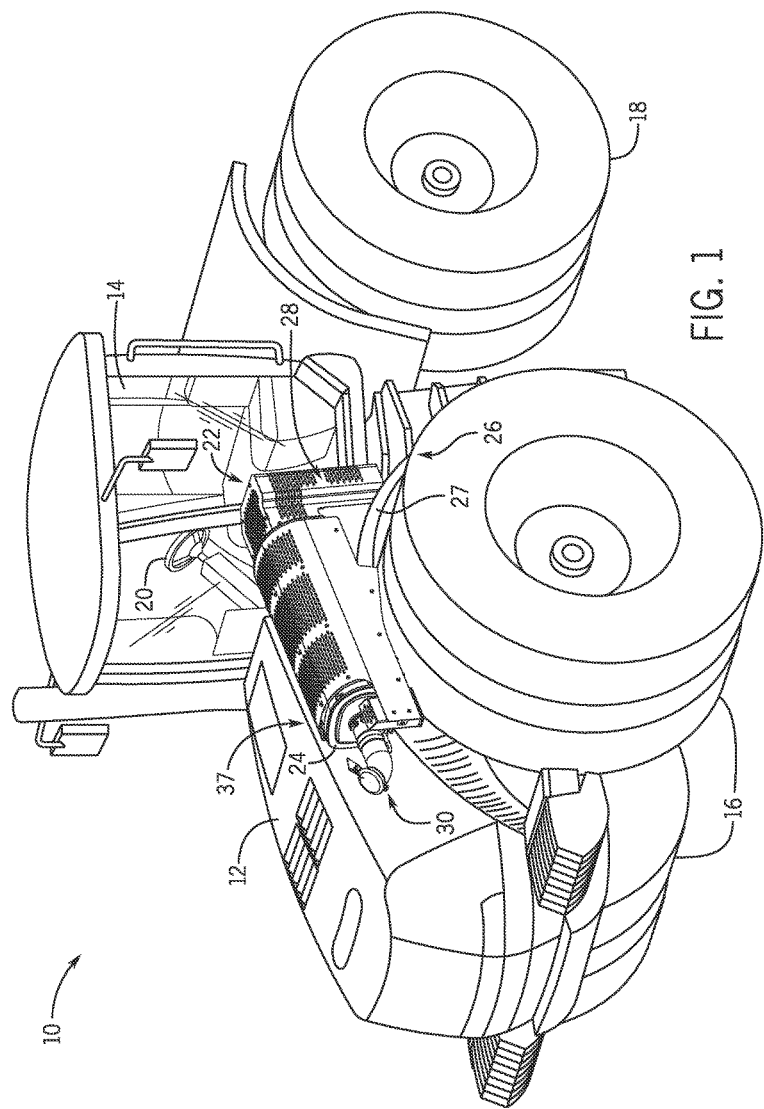
FIG. 1 is a perspective view of an embodiment of an agricultural vehicle with a substantially horizontal muffler.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure are directed toward a mounting assembly for a substantially horizontal muffler and a substantially vertical diesel oxidation catalyst (DOC). The mounting assembly is configured to couple the muffler and DOC to an off-road vehicle. The muffler is arranged in a substantially horizontal position in front of a cabin of the off-road vehicle (e.g., relative to the primary direction of travel of the off-road vehicle). Moreover, a substantially vertical DOC is coupled to the muffler and positioned behind the muffler (e.g., relative to the primary direction of travel of the off-road vehicle). In certain embodiments, the mounting assembly includes a front mount configured to support the muffler over a front wheel of the off-road vehicle. The front mount is coupled to a frame of the off-road vehicle and includes a platform configured to receive and to support the muffler. Furthermore, the mounting assembly includes a rear mount coupled to a fender of the off-road vehicle. In certain embodiments, the rear mount is formed as an integral part of the fender. The rear mount includes a panel disposed on the fender at a downward angle relative to a ground plane. The front and rear mounts are configured to orient the muffler at a downward angle relative to the ground plane along a primary direction of travel. By mounting the muffler at the downward angle, the muffler may be out of the line of sight of an operator of the off-road vehicle. The mounting assembly also includes support members disposed along the front mount and the fender. The support members are configured to increase the structural rigidity of the front mount and the fender to reduce movement of the muffler while the off-road vehicle is moving through a field, for example.

FIG. 1 is a perspective view of an embodiment of an off-road vehicle (e.g., an agricultural vehicle) 10 with a substantially horizontal muffler and substantially vertical DOC. In certain embodiments, the off-road vehicle 10 may be any type of tractor, off-road vehicle, work vehicle, or any other suitable vehicle that utilizes an exhaust system. The off-road vehicle 10 has a body 12 that typically houses an engine, transmission, and power train. Furthermore, the off-road vehicle 10 has a cabin 14 where an operator may sit or stand to operate the off-road vehicle 10. The off-road vehicle 10 has two front wheels 16 and two rear wheels 18 that rotate to move the off-road vehicle 10. As illustrated, the off-road vehicle 10 is maneuvered using a steering wheel 20 configured to articulate the off-road vehicle 10 about an axis. In certain embodiments, the steering wheel 20 may turn the front wheels 16 (or the rear wheels 18) to control the steering of the off-road vehicle 10.

The off-road vehicle 10 includes an exhaust system 22. As illustrated, the exhaust system 22 includes a muffler 24 (e.g., silencer) configured to direct exhaust gas out of the engine of the off-road vehicle 10. The muffler 24 is also configured to reduce a noise of the exhaust system 22. For example, the muffler 24 may be configured to reduce the magnitude of sound pressure oscillations created by the engine by damping the oscillations. In certain embodiments, the muffler 24 includes a selective catalytic reduction reactor (SCR) to remove certain emissions from the exhaust stream. As a result, in some embodiments, the muffler 24 may not be cylindrical. For example, the cross-section of the muffler 24 may be substantially D-shaped, elliptical, or the like. As illustrated, the muffler 24 is mounted so that a longitudinal axis of the muffler 24 extends in a substantially horizontal direction (e.g., substantially parallel to the ground). As illustrated, the muffler 24 is mounted proximate to a fender 26 of one front wheel 16. The fender 26 includes a shell 27 forming the general shape of the fender 26. In the illustrated embodiment, a front portion 37 of the muffler 24 is angled downward relative to the surface of the ground. Furthermore, the muffler 24 is mounted forward of the cabin 14 (e.g., relative to a primary direction of travel), forward of the steering wheel 20, and adjacent to the body 12 of the off-road vehicle 10. Such a position and orientation of the muffler 24 may place the muffler 24 out of a line of sight of an operator within the cabin 14, thereby enhancing operator visibility.

In the illustrated embodiment, the exhaust system 22 also includes a diesel oxidation catalyst (DOC) 28. As shown, the DOC 28 is mounted in a substantially vertical orientation relative to the ground (e.g., substantially perpendicular to a ground plane). The DOC 28 is an exhaust after treatment system configured to oxidize hydrocarbons and carbon monoxide in the exhaust stream. In certain embodiments, diesel exhaust fluid may be injected downstream of the DOC 28 to facilitate further reactions in the SCR. As will be discussed below, the DOC 28 may be coupled directly to the muffler 24, e.g., via a mounting assembly 30. The mounting assembly 30 is also configured to couple the muffler 24 and the DOC 28 to a frame of the off-road vehicle 10.

Figure 2:
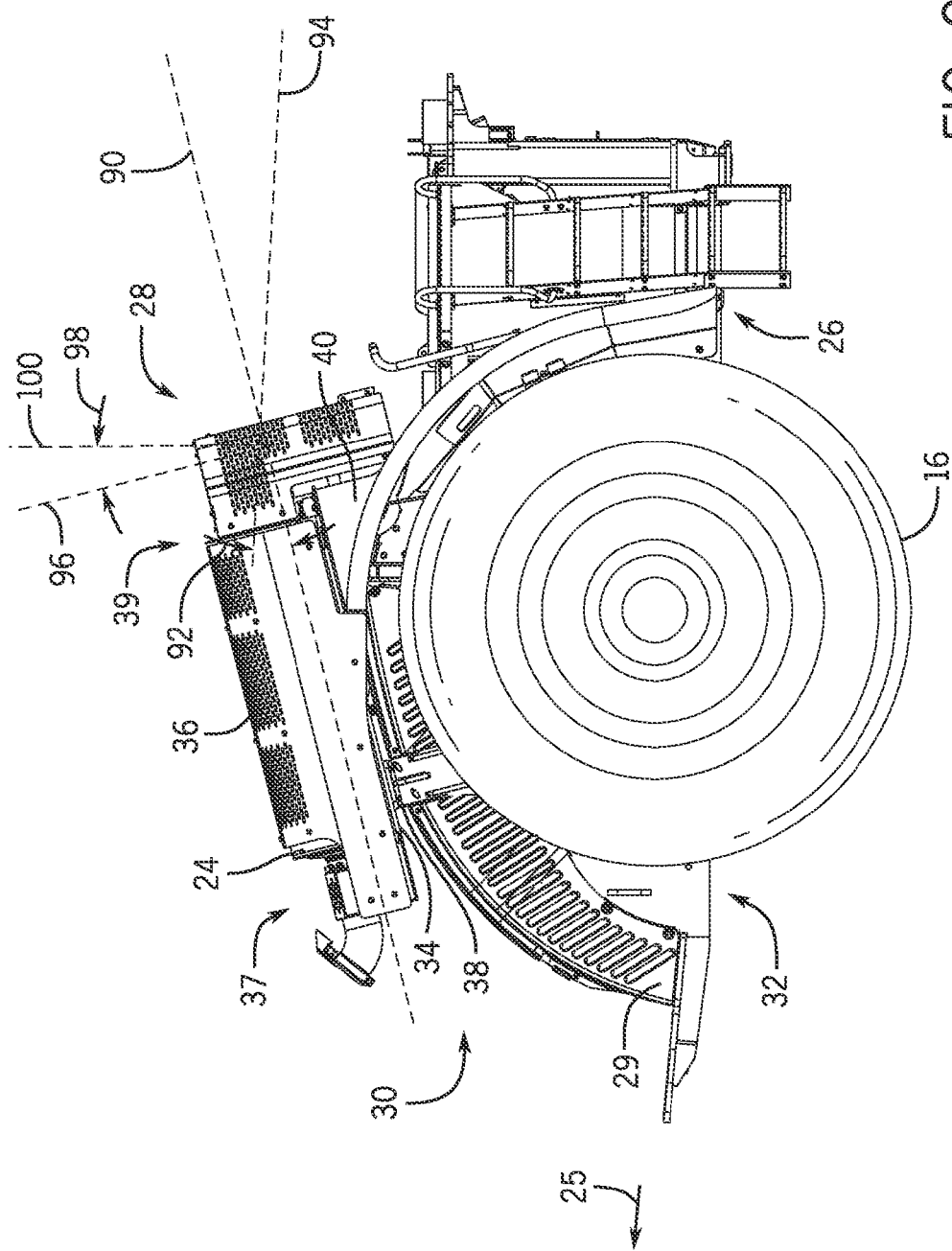
FIG. 2 is a side view of an embodiment of an exhaust system that may be used on the agricultural vehicle of FIG. 1.

FIG. 2 is a side view of an embodiment of the mounting assembly 30, which is configured to couple the muffler 24 and the DOC 28 to a frame 32 of the off-road vehicle 10. The muffler 24 is mounted on a muffler mount 34, and a cover 36 extends from the mount 34. Moreover, in the illustrated embodiment, the DOC 28 is coupled to the muffler 24 via the mounting assembly 30. In the illustrated embodiment, the muffler 24 is coupled to the frame 32 of the off-road vehicle by a front mount 38 and a rear mount 40. In certain embodiments, the front mount 38 is separate and independent from the rear mount 40. As will be described in detail below, the front mount 38 is configured to support the weight of the muffler 24 via a direct connection to the frame 32. As shown, the front mount 38 extends through a debris screen 29, which is configured to block debris (e.g., mud, rocks, etc.) from contacting the engine. Moreover, the rear mount 40 is integrated within the fender 26 and configured to support the muffler 24 via a connection between the fender 26 and the frame 32.

In the illustrated embodiment, the muffler 24 is oriented at a downward angle relative to the ground (e.g., relative to a substantially horizontal line, a ground plane, etc.). That is, the front portion 37 of muffler 24 is lower than a rear portion 39 of the muffler 24, relative to the ground. For example, a longitudinal axis 90 of the muffler 24 is oriented at an angle 92 relative to a horizontal axis 94. In certain embodiments, the angle 92 is equal to approximately 20 degrees. However, in other embodiments, the angle may be 10 degrees, 30 degrees, 40 degrees, 50 degrees, or any suitable angle to orient the muffler 24 out of the line of sight of the operator. As described above, the muffler 24 is mounted in the substantially horizontal orientation. As used herein, the substantially horizontal orientation will refer to the angle 92 plus or minus approximately 20 degrees relative to the horizontal axis 94 and/or the ground plane. Moreover, the muffler 24 is positioned forward (e.g., relative to a direction of travel 25) of the cabin 14. As described above, the downward angle 92 of the muffler 24 may orient the muffler out of the line of sight of the operator of the off-road vehicle 10. Furthermore, in certain embodiments, the downward orientation of the muffler 24 may shift a portion of the weight of the muffler 24 and/or the DOC 28 to the front mount 38.

Moreover, the DOC 28 is oriented substantially vertically, relative to the ground. That is, a longitudinal axis 96 of the DOC 28 is oriented at an angle 98 relative to a vertical axis 100. In certain embodiments, the angle 98 is equal to approximately 20 degrees. However, in other embodiments, the angle may be 10 degrees, 30 degrees, 40 degrees, 50 degrees, or any suitable angle to orient the DOC 24 out of the line of sight of the operator. As used herein, the substantially vertical orientation will refer to the angle 98 plus or minus approximately 20 degrees relative to the horizontal axis 94 and/or the ground plane. Accordingly, the DOC 28 is substantially perpendicular to the muffler 24. In the illustrated embodiment, the DOC 28 is mounted above the fender 26. However, in alternative embodiments, the DOC 28 may be mounted to the side of the fender 26 (e.g., laterally offset from the fender 26), proximate to the body 12, or any other suitable location. The DOC 28 is fluidly coupled to the muffler 24 to direct exhaust gas from the engine to the muffler 24. Moreover, in the illustrated embodiment, the DOC 28 is mechanically coupled to the muffler 24.

Figure 3:
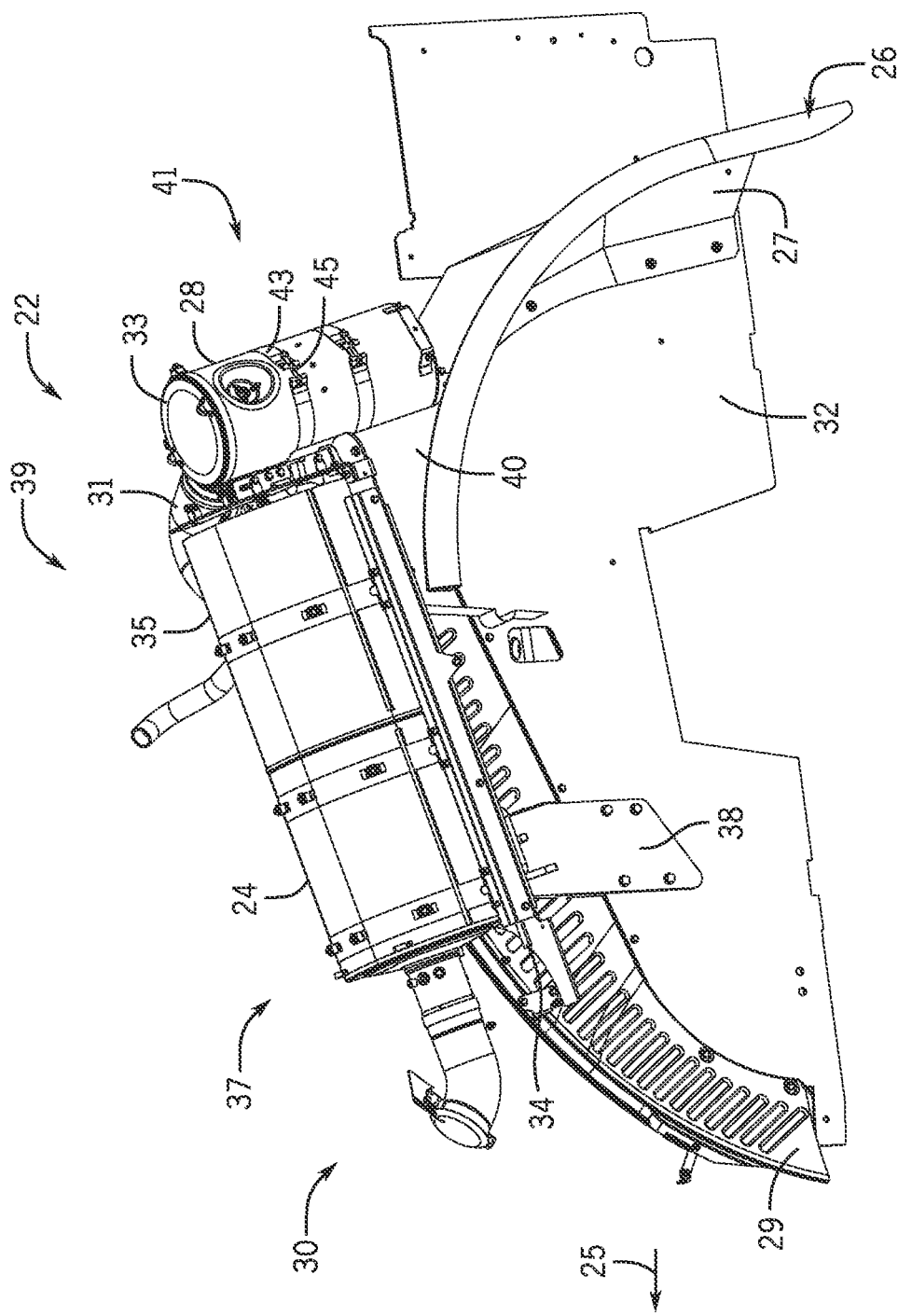
FIG. 3 is a side perspective view of the exhaust system of FIG. 2, in which a cover is removed.

FIG. 3 is a perspective view of the exhaust system 22, in which the cover 36 is removed for clarity. As shown, the muffler 24 is supported by the muffler mount 34, which is coupled to the front mount 38. However, in certain embodiments, the muffler 24 may be coupled directly to the front mount 38 via bolts, straps, or the like. As described above, the muffler 24 is arranged in a substantially horizontal orientation. For example, as shown, the muffler 24 is angled downwardly, relative to the ground such that the front portion 37 of the muffler is closer to the ground than the rear portion 39 of the muffler 39, which is located rearward of the front portion 37 relative to the primary direction of travel 25. Furthermore, the first end 37 is farther from the cabin 14 than the second portion 39, relative to the direction of travel 25. The downward angle of the muffler 24 is configured to locate/orient the muffler 24 substantially out of the line of sight of the operator of the off-road vehicle 10. Moreover, by arranging the muffler 24 in the substantially horizontal orientation, larger mufflers 24 may be installed while maintaining the operator's field of view.

In the illustrated embodiment, the DOC 28 is coupled to the muffler 24 via a DOC mounting assembly 41. As will be described below, the rear mount 40 is configured to receive the DOC 28 and, in certain embodiments, may be formed such that the rear mount 40 substantially corresponds to a circumference of the DOC 28. For example, the DOC mounting assembly 41 is configured to mechanically couple the DOC 28 to the rear mount 40 and/or to the muffler 24. In the illustrated embodiment, the DOC mounting assembly 41 includes straps 43 secured by fasteners 45 configured to couple the DOC 28 to the rear mount 40 and/or to the muffler 24. For instance, the straps 43 may be coupled (e.g., welded, fastened, etc.) to the rear mount 40 and be configured to receive and to circumferentially surround the DOC 28. The fasteners 45 may secure the straps 43 (e.g., fasten the two ends of the straps 43 together) around the DOC 28 to mechanically couple the DOC 28 to the rear mount 40. In certain embodiments, the fasteners 45 include bolts that are tightened to secure the ends of the straps 43 together. Moreover, by adjusting the straps 43 using the fasteners 45, different DOCs 28 with a range of outer circumferences may be used with the mounting assembly 30. Moreover, in certain embodiments, the DOC 28 is mounted over the fender 26. However, in other embodiments, the DOC 28 may be mounted proximate to the fender 26 (e.g., to the side of the fender 26 laterally offset from the muffler 24) or in another suitable location. In the illustrated embodiment, the DOC 28 is fluidly coupled to the muffler 24 via a conduit 31. The conduit 31 is configured to direct exhaust gas from the DOC 28 to the muffler 24. As shown, the DOC 28 is mounted in a substantially vertical orientation. Accordingly, the DOC 28 is substantially perpendicular to the muffler 24 and/or to the ground. Moreover, in certain embodiments, a top portion 33 of the DOC 28 may be substantially aligned with a top portion 35 of the muffler 24. In other words, the DOC 28 is arranged such that the DOC 28 extends to approximately the same height as the muffler 24, thereby remaining substantially out of the line of sight of the operator of the off-road vehicle 10.

Figures 4, 5:
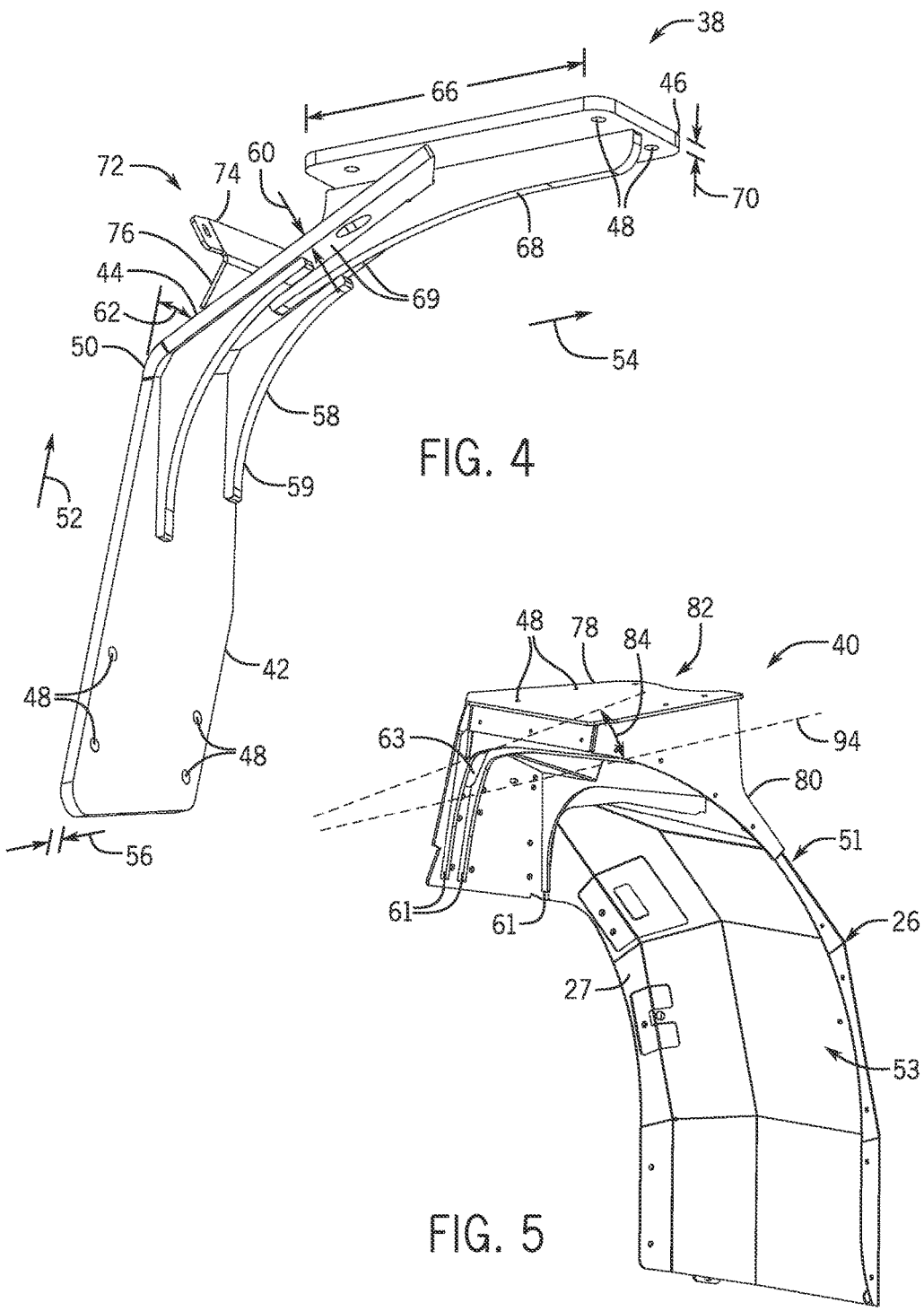
FIG. 4 is a perspective view of a front mount of the exhaust system of FIG. 2.
FIG. 5 is a perspective view of a rear mount of the exhaust system of FIG. 2.

FIG. 4 is a perspective view of the front mount 38. The front mount 38 is configured to support the muffler 24 over the front wheel 16. In the illustrated embodiment, the front mount 38 includes a base 42, a body 44, and a platform 46. The base 42 is configured to couple to the frame 32 of the off-road vehicle 10. For example, the base 42 may be fastened to the frame 32 via fasteners extending through apertures 48 disposed in the base 42. In the illustrated embodiment, there are 4 apertures 48, however in other embodiments there may be 1, 2, 3, 5, 6, 7, 8, 9, 10, or any suitable number of apertures 48 to facilitate coupling the base 42 to the frame 32. Moreover, in other embodiments, the base 42 may be welded to the frame, strapped to the frame, or the like.

In the illustrated embodiment, the front mount 38 includes a bend 50. The bend 50 establishes a transition between the base 42 and the body 44. For example, the base 42 extends substantially vertically from the frame 32 toward the platform 46. However, at the bend 50, the body 44 extends laterally outward from the frame 32 toward the front wheel 16. In other words, the base 42 extends in a substantially vertical direction 52, while the body 44 is angled to extend between the substantially vertical direction 52 and a substantially horizontal direction 54. In the illustrated embodiment, the direction 54 is toward the front wheel 16 and the muffler 24 (e.g., over the front wheel 16). Furthermore, the thickness 56 of base 42 is configured to enable adequate clearance for the front wheel 16. For example, in certain embodiments, the thickness 56 is approximately ⅛". However, in other embodiments, the thickness 56 may be 1/16", ¼", ½", or any suitable thickness that enables adequate clearance for the front wheel 16. Because the base 42 is mounted proximate to the front wheel 16, the thickness 56 is configured to establish approximately the same wheel clearance as the clearance between the front wheel 16 and the debris screen 29. That is, the base 42 is formed such that the thickness 56 is small enough to establish the desired clearance with the front wheel 16, while supporting the weight of the muffler 24.

Moreover, the front mount 38 includes front support members 58 (e.g., support members) extending along an inner surface of the front mount at the bend 50. The support members 58 are configured to provide structural support to the base 42 and to the body 44 at the bend 50. For example, in the illustrated embodiment, the support members 58 are gussets welded to the base 42 and to the body 44 along the bend 50. As described above, the support members 58 have a curved inner edge 59 that provides a desired clearance between the support members 58 and the front wheel 16. In the illustrated embodiment, the support members 58 are welded to the base 42 and/or the body 44. However, in other embodiments, the support members 58 may be bolted or otherwise coupled to the base 42 and/or to the body 44. While two support members 58 are shown, in other embodiments there may be 1, 3, 4, 5, 6, or any suitable number of support members 58 to provide structural rigidity to the base 42.

As shown, the body 44 is coupled to the base 42 and the platform 46. In the illustrated embodiment, the body 44 is substantially rectangular. However, in other embodiments, the body 44 may be other shapes, such as elliptical or tubular. Moreover, the body 44 is formed to have a desired thickness 60. For example, in certain embodiments, the thickness 56 is approximately 1/8". However, in other embodiments, the thickness 56 may be 1/16", 1/4", 1/2", or any suitable thickness. In the illustrated embodiment, the base thickness 56 is substantially equal to the body thickness 60. However, in alternative embodiments, the base thickness 56 and the body thickness 60 may be different. The body 44 extends at an angle 62 relative to the base 42 (e.g., toward the muffler 24). As a result, the platform 46, which is coupled to the body 44, extends over the front wheel 16 to facilitate coupling with the muffler 24.

In the illustrated embodiment, the body 44 is coupled to the platform 46 approximately midway along a length 66 of the platform 46. However, in other embodiments, the body 44 may be coupled to the platform 46 at a quarter of the length 66, at three quarters of the length 66, or at any suitable location along the length 66 of the platform 46. Moreover, in the illustrated embodiment, the body 44 is welded to the platform 46. Furthermore, as shown in FIG. 4, a platform member 68 extends along the length 66 of the platform 46 and through the body 44. That is, the platform member 68 splits the body 44 into segments 69. As a result, the platform 46 is supported by the platform member 68 while also being coupled to the body 44. The platform member 68 is curved to provide clearance between the front wheel 16 and the platform member 68.

The configuration of the body 44, along with the platform 46 and platform member 68, enables the front mount 38 to flex and/or bend when acted upon by the weight of the muffler 24. That is, while the support members 58 provide structural support to the body 44, the body 44 is configured to flex to absorb energy as the off-road vehicle 10 traverses uneven terrain. For example, the platform 46 may flex approximately 1/8" when acted upon by the weight of the muffler 24. However, in other embodiments, the platform 46 may be configured to flex 1/4", to flex 1/2", or any suitable distance. However, in certain embodiments, the front mount 38 is configured to limit flexing to a desired amount. Moreover, the front mount 38 may be used for mufflers 24 having different shapes and weights.

In the illustrated embodiment, the platform 46 is configured to couple to the muffler mount 34, which supports the muffler 24. As shown in FIG. 4, the platform 46 is a generally rectangular piece with rounded edges having a thickness 70. For example, in certain embodiments, the thickness 56 is approximately 1/8". However, in other embodiments, the thickness 56 may be 1/16", 1/4", 1/2", or any suitable thickness. In certain embodiments, the thickness 70 is equal to the thickness 56 and the thickness 60. However, the thickness 70 may be smaller or larger (e.g., based on the weight of the muffler 24). As mentioned above, the platform 46 is supported by the platform member 68 and the body 44. In the illustrated embodiment, the platform 46 includes apertures 48 configured to facilitate coupling the platform 46 to the muffler mount 34. While the illustrated embodiment includes four apertures 48, in other embodiments there may be 1, 2, 3, 5, 6, 7, 8, 9, 10, or any suitable number of apertures 48 to enable fasteners to secure the platform 46 to the muffler mount 34. Moreover, in other embodiments, the platform 46 may be welded or otherwise secured to the muffler mount 34.

The front mount 38 includes an attachment assembly 72, in the illustrated embodiment. The attachment assembly 72 includes a plate 74 and a seat 76. As shown, the attachment assembly 72 is mounted on the body 44 via the seat 76. The plate 74 is coupled to the seat 76 and is configured to couple to the debris screen 29. Accordingly, the front mount 38 is secured to the frame 32 and to the debris screen 29 while the mount 38 is installed on the off-road vehicle 10.

FIG. 5 is a perspective view of the rear mount 40 integrally formed within the fender 26. The rear mount 40 includes a panel 78 (e.g., a first surface) coupled to structural supports 80 disposed on a top surface 51 of the shell 27 of the fender 26. In certain embodiments, the rear mount 40 may not be integrally formed with the fender 26 and, instead, may be coupled to the shell 27 of the fender 26 via the structural supports 80. Moreover, rear support members 61 (e.g., support members) are disposed along an inner surface 53 of the shell 27 of the fender 26. As shown, the support members 61 are substantially aligned with the panel 78. In the illustrated embodiment, the panel is configured to receive the muffler 24. In addition, the panel includes a recess 82 configured to accommodate the body of the DOC 28 and/or the cover 36. Furthermore, the panel 78 includes apertures 48 for coupling the muffler 24 to the panel 78 via fasteners. However, in other embodiments, the muffler 24 may be welded or otherwise attached to the panel 78. In the illustrated embodiment, the panel 78 is angled downwardly relative to the horizontal axis 94 at an angle 84. As mentioned above, by angling the muffler 28 downwardly, the exhaust system 22 may be out of the line of sight of the operator.

In the illustrated embodiment, the support members 61 are coupled to the inner surface 53 of the shell 27 of the fender 26. While the illustrated embodiment has 3 support members 61, other embodiments may have 1, 2, 3, 5, 6, 7, 8, 9, 10, or more support members 61. The support members 61 are configured to provide structural rigidity to the fender 26 to enable the fender 26 to support the weight of the muffler 24 and/or the DOC 28. As shown, the shell 27 of the fender 26 is generally formed from bent metallic plate. By placing the support members 61 beneath the panel 78, the fender 26 is supported, thereby enabling the fender 26 to support the muffler 24 and/or the DOC 28. Moreover, as described above, the support members 61 contain a generally curved inner edge 63 to establish a desired clearance with the front wheel 16.

FIG. 6 is a front perspective view of the muffler 24 mounted to the mounting assembly 30. As described above, the front mount 38 is coupled to the frame 32 and supports the muffler 24, which extends over the front wheel 16. The base 42 is coupled to the frame 32 and extends in the substantially vertical direction 52 toward the body 44. The body 44 extends laterally toward the front wheel 16 at the angle 62 to support the platform 46 and the platform member 68. Moreover, the support members 58, 61 and the platform member 68 have generally curved inner edges 59, 63 to provide a desired clearance with front wheel 16.

As described in detail above, the mounting assembly 30 includes the front mount 38 and the rear mount 40 to support the substantially horizontal muffler 24. The muffler 24 is configured to extend forward of the cabin 14 relative to the direction of travel 25 and over the front wheel 16. Moreover, the muffler 24 is positioned at a downward angle relative to the ground. Furthermore, in certain embodiments, the DOC 28 is mounted in a substantially vertical orientation and coupled to the muffler 24. The front mount 38 is coupled to the frame 32 and extends upward to support the muffler over the front wheel 16. The front mount 38 includes the base 42 coupled to the frame 32 and the body 44 extending over the front wheel 16. Moreover, the platform 46 and platform member 68 provide support for the muffler 24. Furthermore, support members 58 are disposed along the front mount 38 for increased structural rigidity. The mounting assembly 30 also includes the rear mount 40 coupled to the fender 26. In certain embodiments, the rear mount 40 is an integral part of the fender 26. The rear mount 40 includes the panel 78 configured to receive the muffler 24. The panel 78 is angled downward at an angle 84 relative to the ground to position and orient the muffler 24 and/or the DOC 28 out of the line of sight of the operator of the off-road vehicle 10. Furthermore, the support members 61 are coupled to the inner side of the fender 26 to provide structural support to the fender 26. As a result, the muffler 24 is mounted in a substantially horizontal orientation and the DOC 28 is mounted in a substantially vertical orientation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An exhaust system for an off-road vehicle, comprising:
a muffler coupled to a frame of the off-road vehicle and mounted in a substantially horizontal orientation;
a diesel oxidation catalyst (DOC) fluidly and mechanically coupled to the muffler, wherein the DOC is mounted in a substantially vertical orientation rearward of the muffler relative to a primary direction of travel of the off-road vehicle, and
a mounting assembly configured to couple the exhaust system of the off-road vehicle wherein the mounting assembly comprises:
a front mount coupled to the frame of the off-road vehicle, and
a rear mount integrally formed within a fender of the off-road vehicle, wherein the front and rear mounts are configured to support the muffler above a wheel of the off-road vehicle.

2. The exhaust system of claim 1, wherein the muffler is oriented at a downward angle relative to a ground plane along the primary direction of travel.

3. The exhaust system of claim 1, wherein the DOC and the muffler are positioned forward of a cabin of the off-road vehicle relative to the primary direction of travel, and the DOC and the muffler are positioned above a fender of the off-road vehicle.

4. The exhaust system of claim 1, comprising a DOC mounting assembly, wherein the DOC mounting assembly comprises at least one strap extending about a periphery of the DOC.

5. The exhaust system of claim 1, wherein the front mount includes a platform extending over the wheel, and the platform is configured to couple the front mount to the muffler.

6. The exhaust system of claim 1, wherein the front mount is coupled to and extends through a debris screen, and the debris screen is coupled to the fender.

7. A mounting assembly for an exhaust system of an off-road vehicle, comprising:
a front mount coupled to a frame of the off-road vehicle, comprising:
a base coupled to the frame and extending in a substantially vertical direction;
a platform coupled to the base and extending laterally outward from the frame, wherein the platform is configured to receive and to support a muffler; and
a rear mount integrally formed within a fender of the off-road vehicle, comprising:
a panel disposed above a top surface of a shell of the fender, wherein the panel is configured to receive and to support the muffler; and
a structural support configured to support the panel above the top surface of the shell of the fender;
wherein the front and rear mounts are configured to support the muffler in a substantially horizontal orientation relative to a ground plane.

8. The mounting assembly of claim 7, comprising a diesel oxidation catalyst (DOC) mounting assembly configured to mechanically couple a DOC to a rear portion of the muffler and to support the DOC in a substantially vertical orientation.

9. The mounting assembly of claim 8, wherein the DOC mounting assembly comprises at least one strap extending about a periphery of the DOC.

10. The mounting assembly of claim 7, wherein the rear mount comprises at least one support member disposed on a lower surface of the shell of the fender, wherein the support member is configured to support the panel and the structural support.

11. The mounting assembly of claim 7, comprising an attachment assembly configured to couple the front mount to a debris screen of the off-road vehicle.

12. The mounting assembly of claim 7, wherein the panel of the rear mount is oriented at a downward angle relative to the ground plane along a primary direction of travel of the off-road vehicle such that the muffler is angled downward and substantially out of a line of sight of an operator of the off-road vehicle.

13. The mounting assembly of claim 7, wherein the front mount comprises a body laterally extending between the base and the platform, and the body is configured to position the platform over a wheel of the off-road vehicle.

14. The mounting assembly of claim 7, comprising a plurality of support members disposed along a lower surface of the fender, wherein the plurality of support members is configured to support the muffler.

15. An exhaust system for an off-road vehicle, comprising:
a front mount configured to couple to a frame of the off-road vehicle, wherein the front mount is configured to extend over a wheel of the off-road vehicle and to receive a first portion of a substantially horizontal muffler positioned forward of a cabin of the off-road vehicle relative to a primary direction of travel;
a rear mount integrally formed within a fender, wherein the rear mount is configured to receive a second portion of the substantially horizontal muffler; and
a diesel oxidation catalyst (DOC) mounting assembly configured to secure a substantially vertically oriented DOC to a rear portion of the substantially horizontal muffler.

16. The exhaust system of claim 15, wherein the rear mount includes a surface is oriented at a downward angle relative to a ground plane along a primary direction of travel of the off-road vehicle.

17. The exhaust system of claim 16, wherein the surface of the rear mount and the front mount are configured to orient the muffler at the downward angle such that the muffler is out of a line of sight of an operator of the off-road vehicle.

18. The exhaust system of claim 15, wherein the front mount, the rear mount, and the DOC mounting assembly are configured to orient the muffler and the DOC substantially perpendicular to one another.

19. The exhaust system of claim 15, wherein the DOC mounting assembly comprises at least one strap extending about a periphery of the DOC.

\* \* \* \* \*